(12) United States Patent
Pathak et al.

(10) Patent No.: US 9,361,338 B2
(45) Date of Patent: Jun. 7, 2016

(54) OFFLOADED, INCREMENTAL DATABASE STATISTICS COLLECTION AND OPTIMIZATION

(71) Applicant: International Business Machines Corporation, Armonk, NY (US)

(72) Inventors: Ramesh Chandra Pathak, Bangalore (IN); Suryanarayana K. Rao, Karnataka State (IN)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 14/089,855

(22) Filed: Nov. 26, 2013

(65) Prior Publication Data
US 2015/0149405 A1    May 28, 2015

(51) Int. Cl.
  *G06F 7/00*    (2006.01)
  *G06F 17/00*   (2006.01)
  *G06F 17/30*   (2006.01)

(52) U.S. Cl.
  CPC ................................ *G06F 17/30463* (2013.01)

(58) Field of Classification Search
  None
  See application file for complete search history.

(56) References Cited

U.S. PATENT DOCUMENTS

| | | | |
|---|---|---|---|
| 6,418,437 B1 | 7/2002 | Cole | |
| 7,739,269 B2 | 6/2010 | Chaudhuri et al. | |
| 7,831,592 B2* | 11/2010 | Markl | G06F 17/30457 707/718 |
| 7,917,502 B2 | 3/2011 | Cheng et al. | |
| 7,991,763 B2 | 8/2011 | Bestgen et al. | |
| 8,176,088 B2 | 5/2012 | Rjaibi et al. | |
| 2006/0101081 A1* | 5/2006 | Lin | G06F 17/30362 |
| 2006/0294058 A1* | 12/2006 | Zabback | G06F 17/30536 |
| 2008/0177694 A1* | 7/2008 | Chaudhuri | G06F 17/30463 |
| 2008/0256025 A1* | 10/2008 | Bestgen | G06F 17/30424 |
| 2009/0216709 A1* | 8/2009 | Cheng | G06F 17/30442 |
| 2014/0156637 A1* | 6/2014 | Stout | G06Q 50/01 707/722 |
| 2014/0156744 A1* | 6/2014 | Hua | G06Q 30/0251 709/204 |

FOREIGN PATENT DOCUMENTS

WO    0104798    1/2001

\* cited by examiner

*Primary Examiner* — Tuan A Pham
(74) *Attorney, Agent, or Firm* — Schmeiser, Olsen & Watts, LLP; John Pivnichny

(57) ABSTRACT

A method and associated system for offloading the collection and optimization of database statistics to an external computer system, without using significant resources required by the database system during its normal operation. A processor of a computer system captures and stores information about the database's recent transactions, where the captured information describes how each transaction altered the logical description of the database or revised data stored in the database. The processor uses this captured information to update stored metadata that identifies the database's logical structure, and to further update stored database statistics that describe characteristics of the data stored in the database. These updated statistics are then returned to the production database's optimizer module, which uses them to determine how to efficiently respond to database-access requests.

13 Claims, 2 Drawing Sheets

OFFLOADED, INCREMENTAL DATABASE STATISTICS COLLECTION AND OPTIMIZATION

TECHNICAL FIELD

The present invention relates to increasing the efficiency of database access.

BACKGROUND

A database-management means may comprise an optimizer engine that identifies an efficient way, known as an "execution plan," to respond to a database-access request. Such an optimizer engine may be necessary when a database-management means can derive an execution plan from a large number of possible data-access strategies, data join methods, and other implementation-specific details when in order to serve a query, generate a report, or respond to a request to update stored data. In all but the most modest configurations, selecting the most efficient execution plan may require an optimizer engine to consider a huge number of possibilities.

Most optimizers address such tasks by analyzing a set of statistics that characterize the contents of a database. These statistics may include information about stored database objects like tables, fields, records, indices or keys, and partitions. Collecting or gathering such statistics may be a resource-intensive task that requires a distinct statistics-collection function, and this function may need to be performed frequently in order to ensure that the statistics it collects are as current as possible or, as described herein, to ensure that the statistics have not become "stale."

Each such statistics-collection or statistics-generation job may consume so many resources that it reduces database performance to unacceptable levels. When possible, these functions may be scheduled as batch jobs that run after hours in order to minimize their effect on users.

These conflicting requirements may create a paradox for database system designers. If a mission-critical database must be available at all times, it may be difficult to identify idle periods in which a statistics-collection task may be run with minimal effect on database availability or performance. But if statistics-collection tasks are not performed frequently enough, the statistics available to an optimizer engine may become too stale to allow the optimizer to identify execution plans that consistently ensure a efficient response to a database-access request.

BRIEF SUMMARY

A second embodiment of the present invention provides a method for offloading the collection and optimization of database statistics, the method comprising:

a processor of a computer system capturing transaction information of a production database, wherein the production database is stored on a database hardware storage medium, wherein the captured transaction information describes a characteristic of a transaction associated with a stored data element of the production database and with a logical data element associated with the production database, wherein an optimizer module associated with the production database comprises software that increases an efficiency of a data-access operation, and wherein the data-access operation is associated with the stored data element and with the logical data element;

the processor storing the captured information in a transaction-log repository, wherein the transaction-log repository is stored on a first computer-readable hardware storage medium that is distinct from the database hardware storage medium;

the processor updating cumulative statistical data of the production database as a function of the captured transaction information, wherein the cumulative statistical data may be used by the optimizer module to increase the efficiency of the data-access operation;

the processor making the cumulative statistical data available to the optimizer module.

A second embodiment of the present invention provides a computer program product, comprising a computer-readable hardware storage device having a computer-readable program code stored therein, said program code configured to be executed by a processor of a computer system to implement a method for offloading the collection and optimization of database statistics, the method comprising:

the processor capturing transaction information of a production database, wherein the production database is stored on a database hardware storage medium, wherein the captured transaction information describes a characteristic of a transaction associated with a stored data element of the production database and with a logical data element associated with the production database, wherein an optimizer module associated with the production database comprises software that increases an efficiency of a data-access operation, and wherein the data-access operation is associated with the stored data element and with the logical data element;

the processor storing the captured information in a transaction-log repository, wherein the transaction-log repository is stored on a first computer-readable hardware storage medium that is distinct from the database hardware storage medium;

the processor updating cumulative statistical data of the production database as a function of the captured transaction information, wherein the cumulative statistical data may be used by the optimizer module to increase the efficiency of the data-access operation;

the processor making the cumulative statistical data available to the optimizer module.

A third embodiment of the present invention provides a computer system comprising a processor, a memory coupled to said processor, and a computer-readable hardware storage device coupled to said processor, said storage device containing program code configured to be run by said processor via the memory to implement a method for offloading the collection and optimization of database statistics, the method comprising:

the processor capturing transaction information of a production database, wherein the production database is stored on a database hardware storage medium, wherein the captured transaction information describes a characteristic of a transaction associated with a stored data element of the production database and with a logical data element associated with the production database, wherein an optimizer module associated with the production database comprises software that increases an efficiency of a data-access operation, and wherein the data-access operation is associated with the stored data element and with the logical data element;

the processor storing the captured information in a transaction-log repository, wherein the transaction-log repository is stored on a first computer-readable hardware storage medium that is distinct from the database hardware storage medium;

the processor updating cumulative statistical data of the production database as a function of the captured transaction information, wherein the cumulative statistical data may be used by the optimizer module to increase the efficiency of the data-access operation;

the processor making the cumulative statistical data available to the optimizer module.

DETAILED DESCRIPTION

Figure 1:
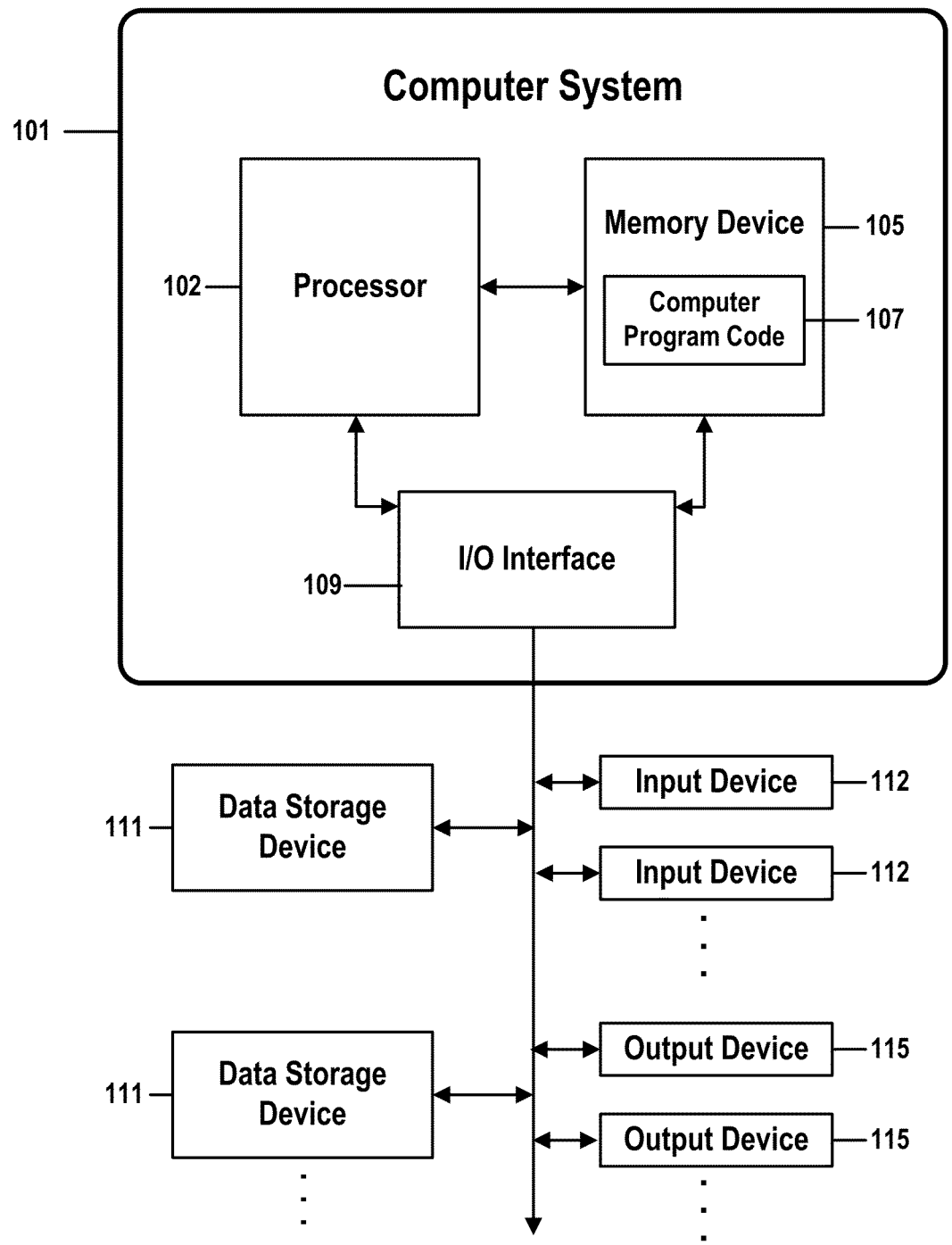
FIG. 1 shows the structure of a computer system and computer program code that may be used to implement a method for offloading the incremental collection and optimization of database statistics.

Embodiments of the present invention perform a method and apparatus for offloading the incremental collection and optimization of cumulative database statistics needed by an optimizer engine of a database-management system associated with the database to identify an efficient execution plan in response to a database-access request. This method may be performed by means of an external processor performing a method, without consuming resources of the production-database system, that comprises: capturing transaction information from a production database; extracting or inferring metadata from the captured transaction information, where the metadata describes logical data elements of the production database revised by transactions identified by the captured transaction information; using information culled from the captured transaction information, possibly including the updated metadata, to update stored cumulative statistics that may be used by the optimizer engine to improve efficiency of production-database queries, and then making that updated statistical information available to the optimizer.

As described above, this method does not require the optimizer to consume resources of the production database system in order to generate the statistical information it needs to identify all possible execution plans, compare the efficiency of the identified plans, and then select an efficient execution plan that optimizes performance of a database-access operation. Captured data may be extracted or inferred from a combination of streaming or stored transaction logs or undo/redo logs that may be generated during normal operation of a production database.

Embodiments of the invention may further ensure that statistics provided to the optimizer are current by generating the updated statistics from transaction information that is continually or continuously captured from the production database.

The use of the term "database" in this document should not be construed to limit the scope of this invention to systems that comprise relational databases or other types of DBMS data structures. Here, the term "database" may further comprise any combination of one or more structured or unstructured information repositories that may made to operate more efficiently by means of statistics-based optimization functions that may improve response time to a query, to an other addition, deletion, or revision of data, to an other request for data access, or to an other type of data-related operations.

A database-management application may comprise an optimizer-engine module that attempts to determine a most efficient "execution plan" that identifies how the database-management application should respond to a query or to an other type of database-access request. An optimizer may perform this function by comparing a large number of permutations and combinations of response options, where these options may include a choice of data-access paths, join methods, data-ordering mechanisms, and other details of a database-access procedure.

Identifying an efficient execution plan may require an optimizer to evaluate statistics that may describe characteristics of data elements stored in the database and that allow the optimizer to compare and rank costs of different access choices. Many types of statistics may be considered, and representative examples are listed in the description of embodiments of FIG. 2.

These statistics may be stored in an implementation-dependent form that may be a function of a standard, convention, technique, manufacturer, or technology of a database, where the form and function are known to those skilled in the art. Cumulative database statistics may, for example, be stored as "runstats" statistical data in a DB2 database platform or as "optimizer stats" in an Oracle database, and may be collected, aggregated, stored, or maintained by any appropriate component of a database-management application to ensure that the statistics are readily available when the optimizer needs to access them.

Because contents of an active database may change frequently, stored statistics must be refreshed from time to time in order to prevent them from becoming outdated, or "stale." The task of refreshing these stored statistics may consume considerable resources of the database-management application, thereby reducing performance of or increasing response time of the database-management application while a statistics-collection job is running. In some cases, collecting or refreshing statistics further requires manual participation of a database administrator or of other system-management personnel.

Scheduling a statistics-collection job during off-hours may be difficult if a database must be available at all times, and decreasing a frequency of performance of statistics-collection jobs in order to reduce their impact on performance may compromise an operation of an optimizer module by increasing the staleness of the statistics the optimizer needs to perform its job effectively.

Embodiments of the present invention address these issues by offloading statistics collection of one or more production databases to an external computer system that is distinct from the production database-management system. This external system maintains and updates a "Statistics Store" local repository of cumulative database statistics by capturing a record of the one or more databases' ongoing transactions, extracting information that identifies a change to database metadata or to actual production data from the captured transaction information, and then using this extracted information to update the external system's stored metadata and statistics. Here, the captured transaction information, the extracted metadata, and the set of cumulative statistics are all stored on computer-readable storage media of the external system that are distinct from any resource of the one or more production databases.

The updated cumulative statistics in the Statistics Store are accessible to components of the one or more production databases, including one or more optimizer engines associated with the one or more production databases.

If the optimizer engines require statistical information in inconsistent or otherwise differing formats, embodiments of the present invention, using techniques or tools known to those skilled in the art, ensure that each set of statistical information in the Statistics Store is either formatted properly for the optimizer engine associated with the set of information, or that a component of the one or more production databases is capable of translating the set of information into a format that allows the set of information to be used by an associated optimizer engine.

FIG. 1 shows the structure of a computer system and computer program code that may be used to implement a method for offloading the incremental collection and optimization of database statistics in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code, said program code implementing methods of the present invention, do not comprise a signal generally, or a transitory signal in particular.

Any combination of one or more computer-readable medium(s) or devices may be used. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection, a portable computer diskette, a hard disk, a random access memory (RAM), a read-only memory (ROM), an erasable programmable read-only memory (EPROM or flash memory), Radio Frequency Identification tag, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, a broadcast radio signal or digital data traveling through an Ethernet cable. Such a propagated signal may take any of a variety of forms, including, but not limited to, electro-magnetic signals, optical pulses, modulation of a carrier signal, or any combination thereof.

Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-2 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

Figure 2:
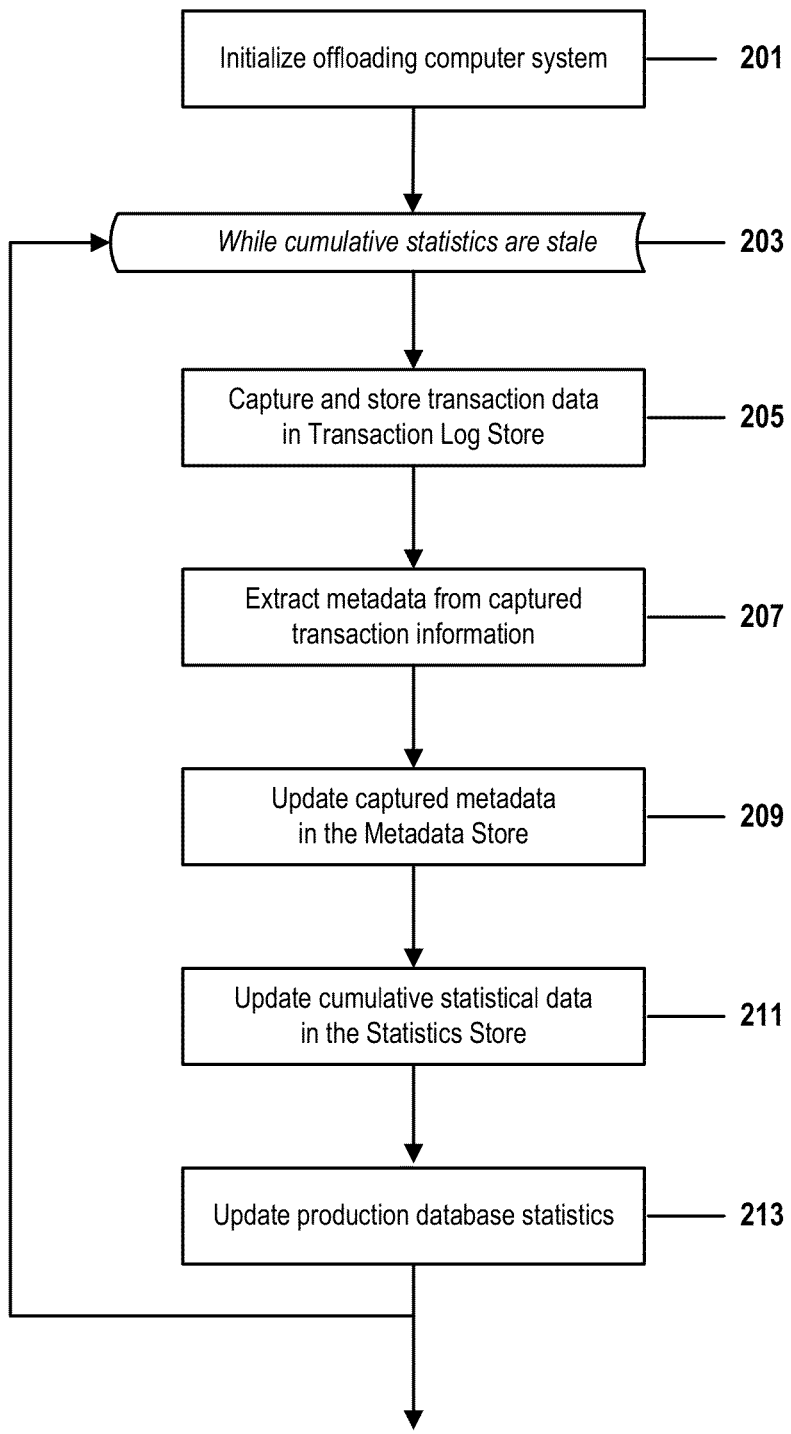
FIG. 2 is a flow chart that illustrates steps of a method for offloading incremental collection and optimization of database statistics in accordance with embodiments of the present invention.

The flowchart illustrations and/or block diagrams FIGS. 1-2 illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for offloading the incremental collection and optimization of database statistics in accordance with embodiments of the present invention, and may implement other embodiments described in this specification, including the methods illustrated in FIGS. 1-2. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for offloading the incremental collection and optimization of database statistics.

Any of the components of the present invention could be created, integrated, hosted, maintained, deployed, managed, serviced, supported, etc. by a service provider who offers to facilitate a method for offloading the incremental collection and optimization of database statistics. Thus the present invention discloses a process for deploying or integrating computing infrastructure, comprising integrating computer-readable code into the computer system 101, wherein the code in combination with the computer system 101 is capable of performing a method for offloading the incremental collection and optimization of database statistics.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for generating a service-catalog entry from discovered attributes of provisioned virtual machines may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for generating a service-catalog entry from discovered attributes of provisioned virtual machines is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

FIG. 2 is a flow chart that illustrates steps of a method for offloading incremental collection and optimization of database statistics in accordance with embodiments of the present invention. FIG. 2 contains steps 201-213.

In step 201, embodiments of the present invention initialize components of an "OISM" (Offloaded Incremental Statistics Management) computer system, which, as described in FIG. 1 and further described below, comprises an "OISM" processor, one or more local or remote computer-readable tangible storage media, computer readable memory for loading software programs that comprise embodiments of the present invention, and a communications means.

The OISM processor runs software necessary to implement embodiments of the present invention and communicates with one or more related or unrelated production databases by means of the communications interface. All resources of the OISM computer system, of embodiments described herein, are distinct from resources comprised by the one or more production databases and their associated database-management entities.

Information repositories comprised by or otherwise associated with the invention are stored on the tangible storage media accessible by the OISM processor, and these repositories may comprise a Transaction Log Store, a Metadata Store, and a Statistics Store. The Transaction Log Store stores descriptions of database transactions captured from the one or more production databases, the Metadata Store stores "metadata" identifications of logical data elements of a data model that describes an organization of data stored in the one or more production databases, and the Statistics Store stores cumulative statistics that describe aggregated or cumulative characteristics of the actual stored contents of the one or more databases. These three storage repositories are described in greater detail below in the description of steps 205-211.

Initialization comprises loading and running on the OISM processor software applications that perform a method of the embodiment; "enrolling" or otherwise identifying to the OISM system each of the one or more production databases; and initiating a means by which the OISM system may capture information describing each transaction performed on or by each enrolled database. This initiating may be performed by means known to those skilled in the art of database management, such as requesting that a database-management component of an enrolled database publish, duplication, stream, store, communicate, or otherwise make available an existing transaction log to the OISM processor, as a stream of data or stored as data on a computer-readable storage medium accessible by the OISM processor.

In some embodiments, a single instance of an embodiment of FIG. 2 may be associated with multiple enrolled databases. In other cases, each database may be independently associated with a distinct instance of an embodiment of FIG. 2. Yet other embodiments may comprise a combination of the two configurations.

Enrolling may further comprise establishing communications between an optimizer engine of a database of the one or more enrolled production database. These communications may be established by means of a direct link or of a network link, or may be established by means of a shared data-storage area, such as the Statistics Store information repository described below.

The initialization may further comprise populating the Metadata Store and Statistics Store information repositories with initial data by means of methods or tools known to those skilled in the art of database management or information technology. The Statistics Store, for example, may be automatically populated by a software tool associated with an optimizer engine of a production database, wherein the software tool extracts a current set of cumulative database statistics from an information repository used by the optimizer engine. This would provide embodiments of the present an initial set of statistics that the embodiment could continue to keep updated, instead of requiring a method of the embodiment to perform the resource-intensive task of generating an initial set of statistics from scratch.

Similar methods or tools known to those skilled in the art may be used to identify an initial set of current metadata information and store it in the Metadata Store area. This information may be copied from information already known or stored by a database-management system of a production database, or it may be provided to the embodiment of the present invention by a module or component of the database-management system through other means available to the module or component.

In some embodiments, initialization may comprise setting a condition that, or otherwise deeming, that an initial set of cumulative database statistics associated with one or more the enrolled production database and stored in the Statistics Store comprises "stale" data. As described below, such a setting or deeming would ensure an immediate performance of a first iteration of an iterative process that comprises steps 203-213.

Step 203 begins the iterative process of steps 203-213, which is performed whenever cumulative database statistics stored in the Statistics Store are deemed to be stale. In some embodiments, these statistics may be deemed to be stale whenever they comprise statistical information about a production database of the one or more enrolled production databases that is not current enough to satisfy a threshold requirement.

The threshold requirement may be implementation-dependent or may be set as a function of a business goal, a technical constraint, a characteristic of a computer platform, a design requirement, or an other factor identified by a system designer, by maintenance or information-technology personnel, by a user, or by an other entity with database-management responsibility.

Cumulative database statistics may, for example, be deemed stale: if the statistics have not been updated within a specified period of time; if a certain number of database transactions have been performed since the last update; or if database performance drops below a certain threshold.

In some cases, cumulative statistics may be deemed to become stale immediately or almost immediately after being updated by step 211, ensuring that the iterative process of steps 203-213 runs continuously. Other embodiments may perform the iterative process of steps 203-213 continuously by default, omitting the conditional test of step 203, in order to ensure that cumulative database statistics stored in the Statistics Store are always as current as possible within technical or business constraints of the embodiment.

If the capturing of step 205 occurs continuously, a capturing means may be configured to continuously capture every transaction that is performed on the production database or that results in a change to any element of data comprised by a production database of the one or more production databases.

In such cases, an other step of the iterative process, such as step 207, 209, 211, or 213, may be performed subject to satisfaction of the condition of step 203.

In step 205, the processor captures transaction-log data that describes transactions that have been performed on data stored by a database of the one or more production databases since the previous capturing of transaction-log data. If more than one database was enrolled in step 201, or if transactions of a single enrolled production database are documented by multiple transaction logs, a procedure of step 205 may track monitor, intercept, or capture multiple streams of or multiple stores of transaction-log data. In some embodiments, the processor continuously captures one or more streams of transaction-log data initialized in step 201.

In some embodiments, the OISM processor may, in addition to or instead of capturing transaction-log data from one or more data streams, capture transaction-log information by accessing the information from a storage area created, maintained, or updated by a component of a database-management system of a database of the one or more production databases.

In some embodiments, the processor may, in addition to or instead of identifying or inferring database-transaction data by capturing information comprised by a transaction log, capture transaction-associated information generated by a database-management system of a database of the one or more production databases for the purpose of supporting the database-management system's undo or redo function.

Captured data may comprise information necessary to reconstruct a revision to a data element of a database of the one or more production databases as a result of a transaction. This information may include every detail of the transaction or of the effect of performing the transaction on the data element of the database, including identification of a changed database file, of a changed block comprised by the file, of a time at which the block was changed or that the transaction was performed, of a sequence in which multiple blocks were changed, and so forth. An exact selection of details comprised by the captured data may be implementation-dependent or may be a function of one or more implementation-dependent factors that is known to those skilled in the art.

In some embodiments, a captured transaction may further revise metadata that describes a data model of, or an other type of logical representation of, a data structure or other organization of data of a database of the one or more production databases. Such a transaction might, for example, add or delete a column of a database table of a relational database, change a column name, add a new table or delete an existing table, or change a data type of a column from a character data format to a numeric data format. Such changes may result in metadata stored in the Metadata Store being revised in step 209.

The processor stores the captured information in an information-storage area called a Transaction Log Store, which may be located on any type of computer-readable storage media accessible to the OISM processor, and where the any type of computer-readable storage medium is distinct from storage media or other resources of the one or more production databases. Like all the types of data stored by embodiments of the present invention, this stored captured transaction data may be formatted in any manner known to those skilled in the art of information technology or data storage. In some embodiments, for example, the captured data may be stored as records of a relational database, as rows of a worksheet of a spreadsheet program, as records of a flat file, as a comma-delimited file, or in a proprietary format deemed to be compatible with the embodiment.

In step 207, the processor runs a Log Reader software component of an embodiment of the present invention, which reads and analyzes the captured transaction data stored in the Transaction Log Store and forwards the results of its analysis to the next component, a Statistics Determination Engine. Using methods known to those skilled in the art, this analysis comprises identification of an incremental revision to metadata of a production database that results from a performance of a captured transaction.

This analysis, as described below, may be performed by means of methods or tools known to those skilled in the art. These methods or tools may, for example, comprise a log-interpretation or a log-analysis Application Program Interface (or "API") that may be specific to a particular database-management system, convention, standard, or manufacturer. Manufacturers and industry groups readily distribute or sell such API tools, which may allow a processor to interpret information comprised by a transaction log, an undo log, or a redo log of a specific type of production database. When an embodiment of the present invention is associated with multiple databases, a distinct API may be required for each database's captured transaction data.

In step 209, the Log Reader uses metadata information extracted or inferred in step 207 from the transaction data stored in Transaction Log Store to update metadata stored in a "Metadata Store" information repository.

The Metadata Store comprises metadata that identifies and characterizes logical data elements associated with a data model of an enrolled database of the one or more production databases. Such metadata elements may comprise an identifier that identifies a logical data structure or other logical component of a data model associated with a production database, where such an identified data structure or logical component might be a table, index, partition, or column, and where such characterizations may comprise the identified object's name, data type, or size, or an index name, index type, column, or other structural element associated with the identified object or with an other data element comprised by or otherwise associated with the identified object. In other words, the Metadata Store stores an identification of an organizational structure of logical data elements of each enrolled production database. The Metadata Store also keeps track of changes to these structural identifications.

In particular, a procedure of step 209 may update stored metadata if an analysis of step 207 identifies that: i) a captured logged transaction has created a new database object; ii) a captured logged transaction has deleted an existing database object; or iii) a captured logged transaction has changed a data type or other characteristic of a database object.

The identification of such creations, deletions, and revisions to data elements or data objects stored in the Metadata Store may be performed by methods or tools known to those skilled in the art, using straightforward procedures. One such procedure, for example, might comprise:

i) identifying whether a logical data object that is created, deleted, or revised by a transaction corresponds to an object identified by metadata stored in the Metadata store;

ii) creating metadata that identifies the logical data object and storing that metadata in the Metadata store if the object was not already identified by metadata in the Metadata Store and if the object was created or revised by the transaction; and iii) deleting or revising existing metadata that identifies the logical data object in the Metadata store if an existing object was deleted or revised by the transaction.

Consider, for example, a sub-schema of a relational database that describes a table "CUSTOMER," where each record of table CUSTOMER comprises three columns: "ACCT#," "CUSTNAME," and "CUSTBALANCE."

If the database stores four instances of the CUSTOMER record, the Metadata Store might store metadata that identifies and characterizes the record and each of the three columns or fields. Some of these metadata items might describe a characteristic of one of these fields, such as an identification of its parent record, table, or sub-schema, a data format (such as character string, integer, or floating-point number), and a length or number of bytes of data needed to store an instance of the field.

In this example, if a captured transaction deletes the CUSTOMER table from the database's data model and deletes all stored instances of fields or records associated with the CUSTOMER table, the Log Reader, or an equivalent or complementary module of the embodiment, might respond by using means known to those skilled in the art to delete all metadata stored in the Metadata Store that identifies the CUSTOMER table, its record structure, and its component fields.

Similarly, if a captured transaction identifies a new table or adds a column to an existing table, the Log Reader would respond in this step by creating and storing new metadata in the Metadata Store that identifies and characterizes these new logical data elements, using methods known to those skilled in the art of database design.

At the conclusion of step 209, the contents of the Metadata Store will have been updated to incorporate results of all transactions captured in step 205. Any additions, deletions, or revisions of logical data elements of the enrolled databases performed as a function of these transactions will have resulted in analogous additions, deletions, or revisions to metadata associated with these data elements in the Metadata Store.

In step 211, the Statistics Determination Engine uses the results of the Log Reader's analysis of step 207 to update a set of cumulative database statistics stored in the Statistics Store. In some embodiments, the Statistics Determination Engine may further use updated metadata stored in the Metadata Store to perform this function by identifying alterations to logical data elements that could affect a value of a stored statistic, or result in the addition or deletion of a statistic.

As described below, the cumulative statistics stored in the Statistics Store describe characteristics of the one or more production databases and may be used by an optimizer engine associated with a database of the one or more production databases to increase an efficiency of an operation of the one or more production databases and, in particular, to more accurately select an efficient execution plan in response to a database-access request.

These stored statistics may comprise many types of statistical data, and a type of stored statistic may be a function of a characteristic of a production database, or may be a function of a characteristic of a database's optimization engine.

Stored statistics may, for example, comprise a statistic that describes a production database's stored data, such as a row count (the number of rows or records of a table that are stored as data of a relational database), a block count (a number of blocks used to store data of a database or data associated with a data structure of a database), a table block count (a number of blocks used to store data associated with a table), an average row length or row size of stored data associated with a table, a column cardinality (a measure of a uniqueness of a set of stored data values associated with a column of a database table), or a number of distinct column values comprised by as stored instance of a record.

Other stored statistics may comprise a statistic that describes a characteristic of an index, primary key, or foreign key of a production database or an other logic element of the database, such as a number of index blocks, a number of leaf blocks in a directed graph data structure comprised by a sub-schema of the database, or a more technical descriptor of the database's contents or organization, or such as a clustering factor. All of these types of statistics are known to those skilled in the art of database management or design.

In one example, a first captured transaction may add a new record of data of a first table to a production database. A log of this transaction may be stored in the Transaction Log Store, and forwarded to the Statistics Determination Engine, which would then, in step 211, use that information to update the cumulative statistics stored in the Statistics Store. If, for example, a "row count" cumulative statistic stored in the Statistics Store identifies a number of rows of data stored as records of the first table, that statistic would be incremented. Similarly, the Statistics Determination Engine might decrement the row count statistic in response to an other captured transaction that deletes a record of data stored as a row of the first table, and it would not change the row count statistic for that table if a third transaction merely revised a value of a field of an existing record of the first table.

In another example, the processor might respond to a second captured transaction that inserts a new row of data into the database as an instance of a record of the first table, by adjusting an "average row size" statistic data stored as instances of the first table. Here, if the average row size of the first table prior to the transaction is identified by a value of a statistic identified as "ARS," the size of the newly inserted row is identified by a value of a statistic "NRS," and the number of rows in the table prior to the transaction is identified by a value of a statistic "RowCnt," then ARS may be updated by information inferred from the second captured transaction by means of a straightforward formula that could be derived by methods known to a person skilled in the art:

$$ARS=((ARS*RC)+NRS)/(RC+1)$$

Many other methods of using information captured from logged transactions to update stored cumulative statistics may be performed in step 211, using straightforward arithmetic computations known to those skilled in the art.

Updating an other cumulative statistic from captured transaction data may require more a complex algorithmic procedure, but even in these cases, the required algorithmic procedure may be performed using a familiar method known to those skilled in the art.

Consider, for example, a procedure that infers an update to a "number of distinct values" statistic by analyzing a captured description of a first transaction. Here, the "number of distinct values" (or "NDV") statistic specifies a number of unique, distinct values stored as instances of a first column of a first table of an enrolled production database. If, for example, these instances comprised five values "JohnSmith," "JaneSmith," "JohnJones," "JohnSmith," and "JanetSmith," the NDV statistic would have a value of "4," indicating that stored instances of the first field comprise four distinct values because two of its five stored values are identical.

Here, the following algorithmic procedure might comprise part of a procedure to update an NDV statistic as a function of a set of transactions that may each have revised one or more values of the first column of the first table:

```
FOR each row of the first table
   IF the transaction replaces the existing value of the row's first column
       with a revised value
       AND the revised value <> another row's first column value
           THEN increment NDV for the first column of the first table.
```

At the conclusion of step 211, the Statistics Determination Engine module will have updated the cumulative statistics stored in the Statistics Store as a function of the transaction information data captured in step 205.

In step 213, a Statistics Update Engine module of the present invention will communicate the updated statistics generated in step 211 to a storage medium accessible to the optimizer engines of the one or more production databases.

The communicating procedure of step 213 may be performed at a predetermined time, at predetermined intervals, or upon a satisfaction of a condition, such as a capturing of a certain number of logged transactions or an identification that a production database's resource use has exceeded a threshold value.

These communicated statistics may then be accessed by one or more optimizer engines of the one or more production databases as required by and in accordance with procedures of a database-management means of the one or more production databases.

In some embodiments, these communicated statistics may be further used by a console operator, system administrator, database administrator, or other entity to perform management functions upon one or more of the enrolled production databases, where these functions that may comprise, but are not limited to:

analyzing and reporting a change in the cumulative statistics of data stored as instances of a database table, of a database index, or of an other logical data element of the database; or analyzing and reporting a variation or a trend associated with selecting data-access execution strategies or associated with a cost of a certain type of query or other database access operation.

In some embodiments, these communicated statistics may be further used by a console operator, system administrator, database administrator, or other entity to analyze and compare cumulative statistics associated with a first enrolled database with analogous statistics associated a second enrolled database in order to report results that may comprise, but are not limited to: a first difference between a characteristic of a first execution plan of the first database and a second execution plan of the second database; or a second difference between a first cost associated with the execution plan and a second cost associated with the second execution plan.

Some embodiments may further identify and report possible causes for the first difference or the second difference or allow an operator or administrator to choose between the two. In such cases, an embodiment might respond to the choice by communicating information to a component of a database-management means or optimizer engine of an enrolled database in order to directly or indirectly alter or influence a choice related to a selection of an execution plan.

In these embodiments, such a feature may be enabled because the communicated statistics are communicated in real-time, or in near-real-time, wherein real-time or near-real-time communications are communications that are performed quickly enough to allow a database-management means of the one or more production databases, which may comprise but are not limited to one or more optimizer engines, to effect ad hoc revisions to a method of selecting an efficient execution plan.

Furthermore, in such embodiments, a procedure of step 215 may further provide suggestions to one or more optimizer engines, or one or more other database-management means, of the one or more production databases, where the suggestions are a function of information communicated in step 215. These suggestions may help the optimizer engines or other database-management means more accurately or more efficiently identify or select an efficient execution plan.

In some cases, this more accurate or more efficient identification or selection may provide benefit when an optimizer engine or other database-management means of the one or more production databases seeks to respond to a database-access request that is made more frequently than other database-access requests or to a class of database-access requests that is made more frequently than other classes of database-access requests.

If, for example, users of an e-commerce database frequently request access to an online catalog index, an embodiment of the procedure of step 215 may provide benefit to an optimizer engine that is attempting to identify or select an efficient execution plan in response to such a request by recognizing a characteristic of the request that identifies the request as a catalog-access request and advising the optimizer how to respond as a function of the identification of the request. In some embodiments, the optimizer may then have an option of deciding how to respond to the advising, but in other embodiments, a procedure of step 215 may determine how the optimizer should respond, all in part, to such a database-access request.

Such advising, suggesting, or determining might comprise, but is not limited to, incorporating a specific index into an execution plan; identifying an execution plan that scans all the contents of a table, instead of retrieving records from the table by means of a predefined index; identifying an execution plan that retrieves records from a table by means of a predefined index, instead of scanning all the contents of the table; identifying an execution plan that joins table in a particular order; and many other implementation-specific tactics known to those skilled in the art of database administration or in other types of information technology or data management.

In some cases, such advising, suggesting, or determining may be performed implicitly by communicating statistics in step 215 that is formatted, structured, or organized in a way that would influence an optimizer engine to make certain decisions.

What is claimed is:

1. A method for offloading the collection and optimization of database statistics, the method comprising:
   a processor of a computer system capturing transaction information of a production database, wherein the production database is stored on a database hardware storage medium, wherein the captured transaction information describes a characteristic of a transaction associated with a stored data element of the production database and with a logical element associated with the production database, wherein an optimizer module associated with the production database comprises software that increases an efficiency of a data-access operation, and wherein the data-access operation is associated with the stored data element and with the logical element,
   wherein the captured transaction information comprises reading stored transaction data from the database hardware storage medium, where the stored transaction data was stored on the database hardware storage medium, and wherein the stored transaction data is selected from the group comprising: one or more transaction logs of the production database; data generated by the database software module to facilitate an undo function of the production database; and data generated by the database software module to facilitate a redo function of the production database;

the processor storing the captured information in a transaction-log repository, wherein the transaction-log repository is stored on a first computer-readable hardware storage medium that is distinct from the database hardware storage medium;

the processor updating cumulative statistical data of the production database as a function of the captured transaction information, wherein the cumulative statistical data may be used by the optimizer module to increase the efficiency of the data-access operation wherein the updating further comprises:

the processor inferring metadata information from the captured transaction information, wherein the metadata information identifies a characteristic of the logical element;

the processor updating a metadata repository as a function of the inferred metadata information, wherein the metadata repository is stored on a second computer-readable hardware storage medium that is distinct from the database hardware storage medium, and wherein the metadata repository stores information that identifies characteristics of a plurality of logical elements associated with the production database;

the processor making the cumulative statistical data available to the optimizer module, wherein the making the cumulative statistical data available comprises an operation selected from the group comprising: storing the cumulative statistical data in a third computer-readable hardware storage medium that is distinct from the database hardware storage medium and that may be accessed by the optimizer module; storing the cumulative statistical data in an information repository that is associated with the optimizer module; and communicating the cumulative statistical data to the optimizer module by means of a communications link between the processor and the optimizer module.

2. The method of claim 1, wherein the production database comprises a plurality of distinct databases, wherein the captured transaction information further describes a characteristic of a component transaction, wherein the component transaction is associated with a stored component data element of a component database of the plurality of distinct databases and with a component logical element associated with the component database, wherein a component optimizer module comprises software that optimizes performance of a component data-access operation, and wherein the component data-access operation is associated with the stored component data element and with the component logical element, the method further comprising:

the processor further inferring cumulative statistical data of the component production database as a further function of the captured transaction information, wherein the cumulative statistical data may be used by the component optimizer module to increase an efficiency of the component data-access operation; and the processor making the cumulative statistical data available to the component optimizer module.

3. The method of claim 1, wherein the captured transaction information comprises data captured from a stream of data generated by a database software module associated with the production database, wherein the stream of data is selected from the group comprising: one or more transaction logs of the production database; data generated by the database software module to facilitate an undo function of the production database; and data generated by the database software module to facilitate a redo function of the production database.

4. The method of claim 1, wherein the data-access operation comprises an operation selected from the group comprising: creating and storing the stored data element in the production database; deleting the stored data element from the production database; and revising a characteristic of the stored data element stored in the production database.

5. The method of claim 1, further comprising providing at least one support service for at least one of creating, integrating, hosting, maintaining, and deploying computer-readable program code in the computer system, wherein the computer-readable program code in combination with the computer system is configured to implement the capturing, storing the captured information, updating, and making available.

6. A computer program product, comprising a computer-readable hardware storage device having a computer-readable program code stored therein, said program code configured to be executed by a processor of a computer system to implement a method for offloading the collection and optimization of database statistics, the method comprising:

the processor capturing transaction information of a production database, wherein the production database is stored on a database hardware storage medium, wherein the captured transaction information describes a characteristic of a transaction associated with a stored data element of the production database and with a logical element associated with the production database, wherein an optimizer module associated with the production database comprises software that increases an efficiency of a data-access operation, and wherein the data-access operation is associated with the stored data element and with the logical element, wherein the captured transaction information comprises reading stored transaction data from the database hardware storage medium, where the stored transaction data was stored on the database hardware storage medium, and wherein the stored transaction data is selected from the group comprising: one or more transaction logs of the production database; data generated by the database software module to facilitate an undo function of the production database; and data generated by the database software module to facilitate a redo function of the production database;

the processor storing the captured information in a transaction-log repository, wherein the transaction-log repository is stored on a first computer-readable hardware storage medium that is distinct from the database hardware storage medium;

the processor updating cumulative statistical data of the production database as a function of the captured transaction information, wherein the cumulative statistical data may be used by the optimizer module to increase the efficiency of the data-access operation wherein the updating further comprises:

the processor inferring metadata information from the captured transaction information, wherein the metadata information identifies a characteristic of the logical element;

the processor updating a metadata repository as a function of the inferred metadata information, wherein the metadata repository is stored on a second computer-readable hardware storage medium that is distinct from the database hardware storage medium, and wherein the metadata repository stores information that identifies characteristics of a plurality of logical elements associated with the production database;

the processor making the cumulative statistical data available to the optimizer module, wherein the making the cumulative statistical data available comprises an operation selected from the group comprising: storing the cumulative statistical data in a third computer-readable hardware storage medium that is distinct from the database hardware storage medium and that may be accessed by the optimizer module; storing the cumulative statistical data in an information repository that is associated with the optimizer module; and communicating the cumulative statistical data to the optimizer module by means of a communications link between the processor and the optimizer module.

7. The computer program product of claim 6, wherein the production database comprises a plurality of distinct databases, wherein the captured transaction information further describes a characteristic of a component transaction, wherein the component transaction is associated with a stored component data element of a component database of the plurality of distinct databases and with a component logical element associated with the component database, wherein a component optimizer module comprises software that optimizes performance of a component data-access operation, and wherein the component data-access operation is associated with the stored component data element and with the component logical element, the method further comprising:

the processor further inferring cumulative statistical data of the component production database as a further function of the captured transaction information, wherein the cumulative statistical data may be used by the component optimizer module to increase an efficiency of the component data-access operation; and the processor making the cumulative statistical data available to the component optimizer module.

8. The computer program product of claim 6, wherein the captured transaction information comprises data captured from a stream of data generated by a database software module associated with the production database, wherein the stream of data is selected from the group comprising: one or more transaction logs of the production database; data generated by the database software module to facilitate an undo function of the production database; and data generated by the database software module to facilitate a redo function of the production database.

9. The computer program product of claim 6, wherein the data-access operation comprises an operation selected from the group comprising: creating and storing the stored data element in the production database; deleting the stored data element from the production database; and revising a characteristic of the stored data element stored in the production database.

10. The computer program product of claim 6, wherein making the cumulative statistical data available comprises an operation selected from the group comprising: storing the cumulative statistical data in a third computer-readable hardware storage medium that is distinct from the database hardware storage medium and that may be accessed by the optimizer module; storing the cumulative statistical data in an information repository that is associated with the optimizer module; and communicating the cumulative statistical data to the optimizer module by means of a communications link between the processor and the optimizer module.

11. A computer system comprising a processor, a memory coupled to said processor, and a computer-readable hardware storage device coupled to said processor, said storage device containing program code configured to be run by said processor via the memory to implement a method for offloading the collection and optimization of database statistics, the method comprising:

the processor capturing transaction information of a production database, wherein the production database is stored on a database hardware storage medium, wherein the captured transaction information describes a characteristic of a transaction associated with a stored data element of the production database and with a logical element associated with the production database, wherein an optimizer module associated with the production database comprises software that increases an efficiency of a data-access operation, and wherein the data-access operation is associated with the stored data element and with the logical element, wherein the captured transaction information comprises reading stored transaction data from the database hardware storage medium, where the stored transaction data was stored on the database hardware storage medium, and wherein the stored transaction data is selected from the group comprising: one or more transaction logs of the production database; data generated by the database software module to facilitate an undo function of the production database; and data generated by the database software module to facilitate a redo function of the production database;

the processor storing the captured information in a transaction-log repository, wherein the transaction-log repository is stored on a first computer-readable hardware storage medium that is distinct from the database hardware storage medium;

the processor updating cumulative statistical data of the production database as a function of the captured transaction information, wherein the cumulative statistical data may be used by the optimizer module to increase the efficiency of the data-access operation wherein the updating further comprises:

the processor inferring metadata information from the captured transaction information, wherein the metadata information identifies a characteristic of the logical element;

the processor updating a metadata repository as a function of the inferred metadata information, wherein the metadata repository is stored on a second computer-readable hardware storage medium that is distinct from the database hardware storage medium, and wherein the metadata repository stores information that identifies characteristics of a plurality of logical elements associated with the production database;

the processor making the cumulative statistical data available to the optimizer module, wherein the making the cumulative statistical data available comprises an operation selected from the group comprising: storing the cumulative statistical data in a third computer-readable hardware storage medium that is distinct from the database hardware storage medium and that may be accessed by the optimizer module; storing the cumulative statistical data in an information repository that is associated with the optimizer module; and communicating the cumulative statistical data to the optimizer module by means of a communications link between the processor and the optimizer module.

12. The system of claim 11, wherein the captured transaction information comprises data captured from a stream of data generated by a database software module associated with the production database, wherein the stream of data is selected from the group comprising: one or more transaction logs of the production database; data generated by the database software module to facilitate an undo function of the production database; and data generated by the database software module to facilitate a redo function of the production database.

13. The system of claim 11, wherein the data-access operation comprises an operation selected from the group comprising: creating and storing the stored data element in the production database; deleting the stored data element from the production database; and revising a characteristic of the stored data element stored in the production database.

\* \* \* \* \*